US005186883A

United States Patent [19]

Beall, III

[11] Patent Number: 5,186,883

[45] Date of Patent: Feb. 16, 1993

[54] METHOD OF FORMING A CONCRETE BLOCK

[76] Inventor: John N. Beall, III, 319 NE. 72nd St., Seattle, Wash. 98115

[21] Appl. No.: 415,407

[22] Filed: Sep. 29, 1989

Related U.S. Application Data

[62] Division of Ser. No. 247,761, Sep. 21, 1988, abandoned.

[51] Int. Cl.$^5$ .......... B29C 39/10

[52] U.S. Cl. .......... 264/275; 264/279.1; 264/333

[58] Field of Search .......... 52/309.9, 309.12, 309.14, 52/309.17, 309.8, 604, 585; 264/275, 333, 256, 279.1

[56] References Cited

U.S. PATENT DOCUMENTS

| | | | |
|---|---|---|---|
| 228,052 | 5/1880 | Frost | 52/585 X |
| 1,293,898 | 2/1919 | Parmley | 52/604 |
| 1,809,508 | 6/1931 | Colby | 52/585 |
| 1,879,676 | 9/1932 | Fulcher | 52/603 |
| 1,976,575 | 10/1934 | MacDonald | 52/604 X |
| 2,244,343 | 6/1941 | Meyercord | 52/585 |
| 2,270,555 | 1/1942 | Putnam | 52/585 X |
| 2,310,734 | 2/1943 | Feldman | 52/585 X |
| 2,681,483 | 6/1954 | Morawetz | 52/585 |
| 3,166,873 | 1/1965 | Rosenfeld | 52/585 X |
| 3,188,370 | 6/1965 | Gotzy | 264/275 |
| 3,298,894 | 1/1967 | Barnette | 52/309.9 X |
| 3,671,368 | 12/1970 | Shelley | |
| 3,839,521 | 10/1974 | Robinson | 264/333 |
| 3,949,531 | 4/1976 | Fanson | 264/256 |
| 3,984,957 | 10/1976 | Piazza | |
| 4,098,040 | 7/1978 | Riefler | |
| 4,185,434 | 1/1980 | Jones | |
| 4,203,941 | 5/1980 | Brooker | 264/275 |
| 4,229,497 | 10/1980 | Piazza | 52/309.12 |
| 4,454,699 | 6/1984 | Stroble | 52/585 |
| 4,584,043 | 4/1986 | Riefler | |
| 4,694,624 | 9/1987 | Juhas | |
| 4,769,964 | 9/1988 | Johnson et al. | 52/309.12 X |

FOREIGN PATENT DOCUMENTS

| | | |
|---|---|---|
| 2552460 | 6/1976 | Fed. Rep. of Germany |
| 2544196 | 4/1977 | Fed. Rep. of Germany |

*Primary Examiner*—Michael Safavi
*Attorney, Agent, or Firm*—Patrick M. Dwyer

[57] ABSTRACT

An insulated concrete building block 10, a method of making block 10 by pouring concrete around a block of insulation 53 in a form box 50, and a construction system employing various alternate configurations of block 10 in a method of construction wherein scaled miniatures of the various blocks are employed to build a model of the structure to be realized, followed by realization of the structure with full scale blocks. Alternate block molding and block keying embodiments are disclosed.

1 Claim, 4 Drawing Sheets

METHOD OF FORMING A CONCRETE BLOCK

This is a division of co-pending application Ser. No. 07/247,761, filed on Sep. 21, 1988.

TECHNICAL FIELD

This invention relates to the construction and concrete industries, particularly to a concrete building block construction system employing discrete insulated building blocks of varying configurations.

BACKGROUND OF THE INVENTION

Conventional construction techniques for residential construction and small to medium commercial construction projects use either a lumber construction method which requires multiple structural, weatherproofing, insulating and finish layers, and many steps in the construction process, and is therefore time consuming and relatively expensive, or which uses something in the nature of conventional cinder blocks which, though inexpensive, have no particular insulating quality of their own and have extremely unpleasing aesthetic exterior appearances. Cinder blocks still require additional layers for interior and exterior finish.

Bricks are expensive, though currently aesthetically pleasing, but they too have poor insulating value, and also require the expenditure of a great deal time and additional reinforcing to achieve a proper structural wall. In addition, the fashioning of openings in walls for doors, windows, and the like typically requires additional construction efforts and finish work to accommodate the window or door product.

In the construction business, details are expense. Any details which may be eliminated in a construction system while at the same time yielding an adequately strong structure with aesthetically pleasing exterior and interior surfaces will save a great deal of time and therefore money, and should meet with great commercial acceptance.

It is known to use building blocks which are a "sandwich" of various building materials and insulation in construction. However such blocks still require details of construction render them not suitable for a quick, easy and efficient construction method.

It is also known to use a system of different shaped blocks including right angles, corners, and top and bottom units. In some cases exterior or interior treatments have been cast into building blocks. It is known to use a two part hollow reinforced concrete shell which is then filled with insulation and used as a building panel. They are 4 × 8 panels, and are created from two separately molded panel halves which are then joined together with the insulation foamed in situ. The result is that the panel is produced with nearly as much complexity as conventional construction systems and is no short cut to simplicity in construction and use. Finally it is known to mold concrete around reinforcing materials through which have been woven webbings of insulating materials.

Few of these known construction methods and systems address any of the problems of construction expense and none of them solve the problems addressed by this invention.

DISCLOSURE OF INVENTION

It is an object of the invention to provide a building block construction system to cut down dramatically on the cost of constructing the exterior walls of residential and commercial buildings.

It is another object of the invention to provide a building block construction system which requires no further application of interior or exterior wall treatment.

It is a further object of the invention to create a building block construction system where blocks can be stacked one upon the other in semi rigid fashion having the blocks keyed to one another.

It is another object of the invention to provide a building block in the approximate dimensions of 2′ × 4, × 1, so that relatively few blocks are required to be stacked in place to form the average wall surface.

It is a further object of the invention to provide a construction block system which provides not only standard rectangular blocks but specialty blocks for use at corners, half blocks, header blocks for accommodating various kinds of arches and openings for light and/or ventilation and/or door systems, gable end blocks and columnar blocks. It is another object of the invention to provide a block construction system in which the structural wall and the internal and external wall treatment are provided in a single unitary monolithic block which is multipurpose, insulated, interlocking, fireproof, insect proof, weatherproof, and earthquake resistant.

It is another object of the invention to provide a unique system of construction whereby a scale model may be built from blocks of plastic or wood which themselves are scale models of the blocks of the construction system, so that upon completion of the model, after easily variable arrangements have been contemplated and tried, the exact specifications of the building projects may be read from viewing, and if necessary disassembling, the model and counting the blocks. This method will also facilitate exact determination of material costs.

It is a still further object of the invention to provide a means of pouring the insulated concrete block which method of construction is simple and inexpensive to carry out.

These and other objects of the invention which will become apparent are accomplished by apparatus and methods further described herein. The invention comprises a building block apparatus in varying configurations suitable for use in modern construction, a method of making the building block, and a method or system of designing the construction project to employ the building blocks and to easily determine an estimate of kinds and numbers of blocks required. These elements of the invention form a unified construction system which has not been heretofore disclosed or applied.

The building blocks are comprised of conventionally available construction grade concrete which may or may not be reinforced and which is poured around a block of insulation substantially the same shape as the desired finished shape of the block, only proportionately smaller. Thus the building block of the invention is an insulated building block made in such a way as to maximize the insulated cross section of the block and to minimize the area across which heat may be conducted by concrete across the block. The block shell has a wall thickness suitable for its intended structural purpose and the thickness may be varied according to local building codes or other building specifications. The blocks may be stacked upon one another and keyed to each other in a variety of ways which are further discussed below.

The blocks are made as large as practically possible, typically 2 feet high by 4 feet long by 1 foot thick in order to minimize the number of blocks that are needed to construct a given wall segment. Also the construction system of the invention envisions minimizing other construction details such as the placement of utilities by having a utility channel in one configuration of the block which is employed at the floor level and in which commonly installed utilities may be laid. In addition the blocks may arrive on site with molded on or adhesively bonded exterior and interior wall treatments to eliminate the steps of exterior and interior wall preparation during the construction process, except for minor joining or grouting at the block interfaces.

The pouring, manufacturing and molding of the blocks is accomplished by conventional concrete industry molding techniques, except that the blocks are poured around a block of insulation which may be any commonly available insulating material such as cellulose or plant fiber, fiberglass, corrugated cardboard, papier-mache, solid foam, semirigid foam or other materials. Various methods of spacing the insulation within a steel form to insure uniform wall and bottom and top thickness around the insulation are disclosed herein. Keyways and, where desired, utility channels are cast into the blocks during the molding process by conventional and well known methods.

BEST MODE FOR CARRYING OUT THE INVENTION

Figure 1:
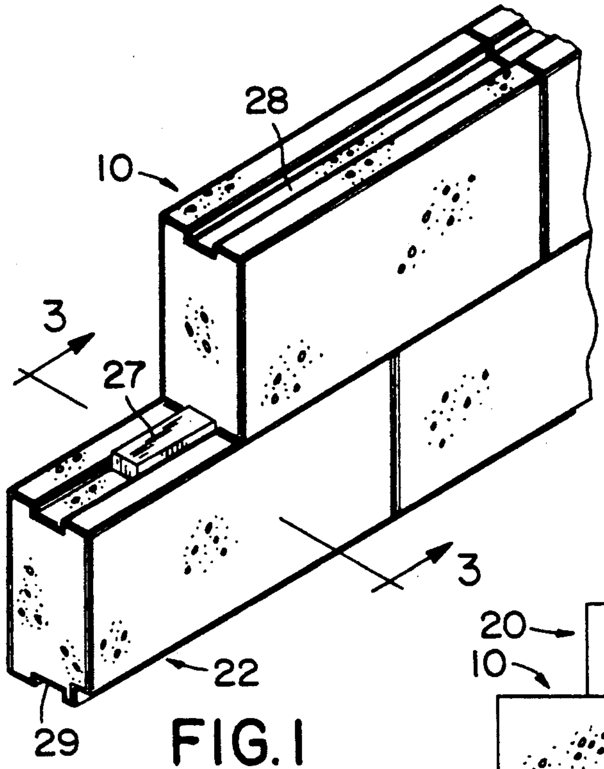
FIG. 1 is perspective view of an embodiment of the construction system of the invention.

Referring now to the drawings wherein like numbers indicate like parts a various embodiments of the invention are described. In FIG. 1 a building block 10 with utility channel 22 is shown with another building block 10 stacked atop it in typical offset block array. In FIG. 3 is shown building block 10 with utility channel 22 comprising a concrete block shell 26 formed around a block of insulation 24. Block shell 26 has cast into it on top an upper keyway 28 and on the bottom a lower keyway 29, with key 27 shown in place in upper keyway 28, for the purpose of creating the interlocked array shown in FIGS. 1 and 2. Keyways 28 and 29 run the length of block 10 and are substantially centered for maximum interchangeability. Keyways 28 and 29 need not however run full length nor be centered, and other keying embodiments may be employed, such as those shown in FIGS. 8, 9, 10 and 11, without departing from the invention. In FIG. 11 is shown a pin keyed block 70 with pin key holes 73 on one long face and pin sockets 72 on an opposite long face of block 70. Tapered pins 71 are a snug fit in respective sockets 72 and the taper of pin 71 is slightly greater than the taper of pin key hole 73 to facilitate smooth joining during construction. Pins 71 and key holes 73 need not be tapered however and any number of pins and key holes may be employed. Pins may be readily available dowels or threaded studs, and keyholes and sockets are cast in by well known methods. Alternatively, pin 71 may be cast directly into block 70 without a separate socket 72.

Figure 2:
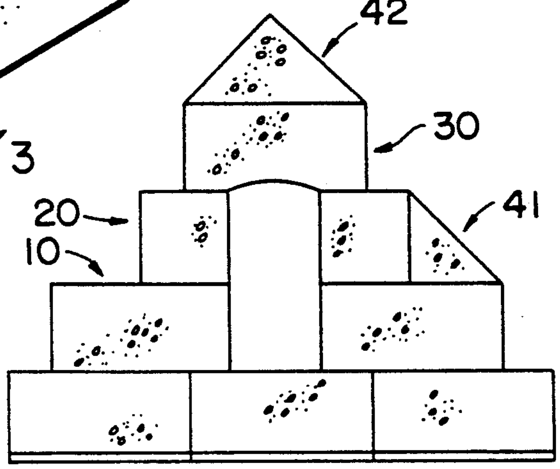
FIG. 2 is a partial front elevation of another embodiment of the construction system of the invention.
Figure 3:
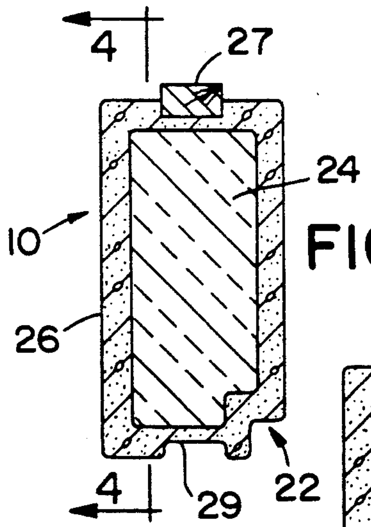
FIG. 3 is a vertical section taken along lines 3—3 in FIG. 1.
Figure 4:
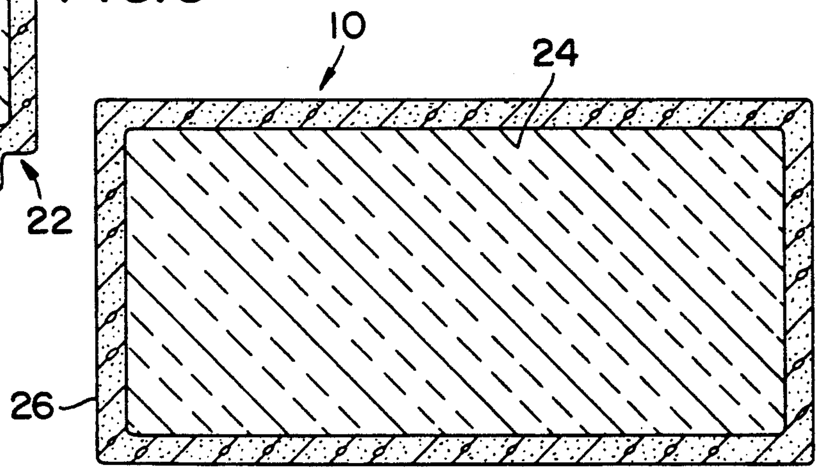
FIG. 4 section taken along lines 4—4 in FIG. 3.

In FIG. 2 is shown another example of the construction system illustrating several building blocks 10 in typical offset array, a half block 20, a header block 30, gable apex block 42, and gable end half block 41 in place. FIG. 4 illustrates a front cross section of building block 10 showing preferred relative proportions of insulating block 24 to block shell 26.

In a preferred embodiment block 10 of the construction system is 2 feet high by 4 feet long by 1 foot thick with the insulation block 24 being approximately 9 inches thick. Thus the walls and bottom and top of block shell 26 are all approximately 1 to 1½ inches thick. Block shell 26 is construction grade concrete and may be conventionally reinforced as required by local building codes and/or the structural requirements of the construction applications. Key 27 is a construction grade pressure treated 2 × 4, though other materials could serve. 2 × 4 lumber is readily available, inexpensive, and easily cut to appropriate lengths.

Utility channel 22 appears only in blocks which are used as the bottom level for any particular story of construction just above floor level. Within utility channel 22 may be enclosed water, electric, and telephone utilities which then may be covered over on the inside with a decorative panel or baseboard (not shown).

Keys way 28 and 29 may be of any cross sectional shape as long as they match the shape of whatever cross sectional shape is chosen for key 27. Key 27 need not necessarily be dimensioned for a snug fit upon the keyways, a sliding fit being sufficient to hold the blocks in their stacked array given their mass. If caulking or other sealing of the key within the keyways is to be applied as an element or insect seal, additional spacing should be allowed, as determined in conventional fashion.

As the block construction system is intended to replace conventional construction methods in a variety of applications, the system comprises blocks in a variety of configurations such as illustrated by header block 30 and other blocks in FIG. 2. In addition there are quarter lengths to facilitate offset stacking, columnar blocks of twice of three times ordinary height to place between closely spaced windows, doors, etc. Other shapes may be devised by persons of ordinary skill in the art in order to facilitate a proper interlocking array and utilitarian construction.

The invention also comprises a method of making the hollow insulated building blocks of the invention, which method comprises the steps of (1) preparing and sizing a block of an appropriate insulation, which in the preferred embodiment is firm enough to resist substantial compression by the wet concrete; (2) spacing the insulation block within a conventionally prefabricated form, preferably made of steel, whose internal dimensions are sized to the external dimensions of the desired block so that the insulation block is equally spaced above the floor of the form and away from the sides of the form; (3) pouring concrete under agitation if necessary, into the form and around the insulation block until the form is filled to its top; (4) allowing concrete to set up green; (5) removing the block from the form; and (6) allowing the block to cure.

A preferred embodiment of the invention also comprises a method of construction comprising the steps of: (1) assembling a model of the construction project using scale model building blocks made of plastic or wood; (2) determining from the model the number of blocks and their type that will be required to complete the project; and (3) building the project from the specifications derived from the model.

Figure 5:
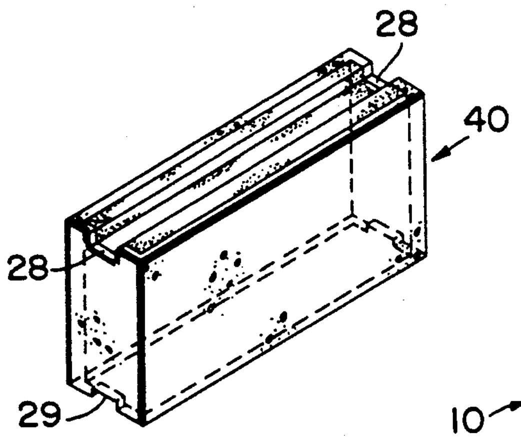
FIG. 5 is a perspective transparent view of an open top and bottom embodiment of the invention with phantom lines showing interior details.

In FIG. 5 an alternate embodiment of the building block is illustrated. In this alternate embodiment the block has neither concrete top nor concrete bottom but is filled with insulation from bottom to top. Keyways 28 and 29 are cast into the end walls of the block in the usual manner but the rest of the keyway is either precut or cast into the insulation block before it is placed in the concrete form and concrete is then poured around the insulation in the manner already discussed, except that there is no room for it to fill in below the bottom of the insulation box and no room to go over the top.

Figure 8:
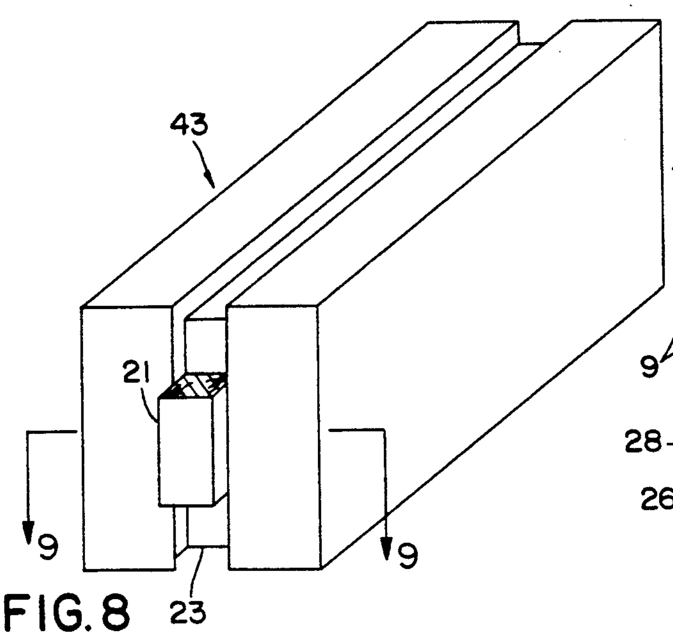
FIG. 8 is an alternative embodiment of the block invention.
Figure 9:
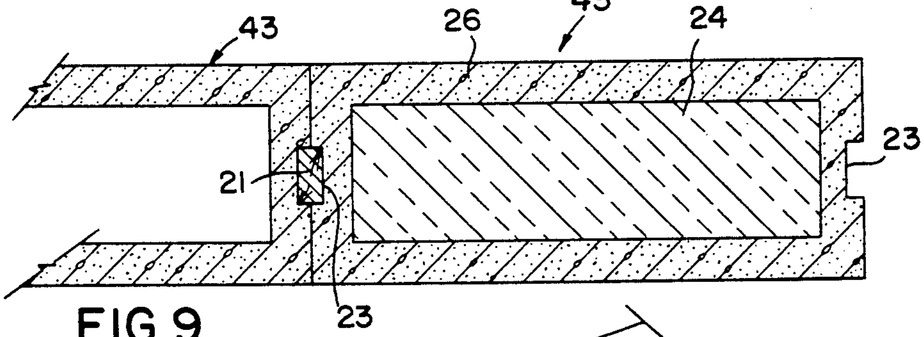
FIG. 9 is a plan section taken along lines 9—9 of FIG. 8.

In FIGS. 8 and 9 another embodiment of the invention is illustrated. Vertical key block 43 has vertical keyways 23 on either end in which may be placed vertical keys 21. This alternate embodiment of the block may be employed to best use on the top rows of a construction project where placement of the roof and rafters prevents the placing of a further keyed horizontal block above it. Thus there is greater need for interlock among the blocks which is provided by the vertical keys and keyways. This embodiment of the block may however be used throughout the construction system where greater lateral strength is desired and for additional sealing between the vertical edges of the blocks.

Figure 10B:
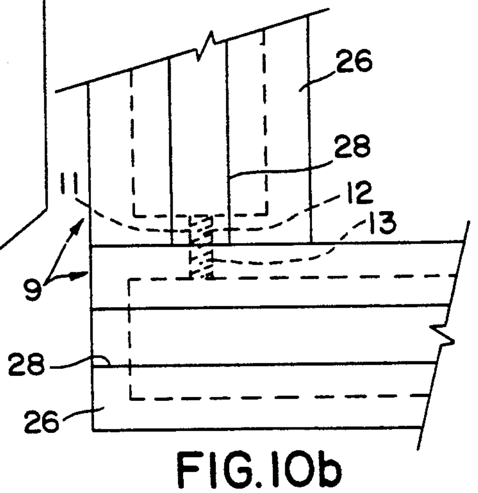
FIG. 10*b* is a partial plan view of two blocks in corner arrangement illustrating details of an alternate corner linkage method.
Figure 10A:
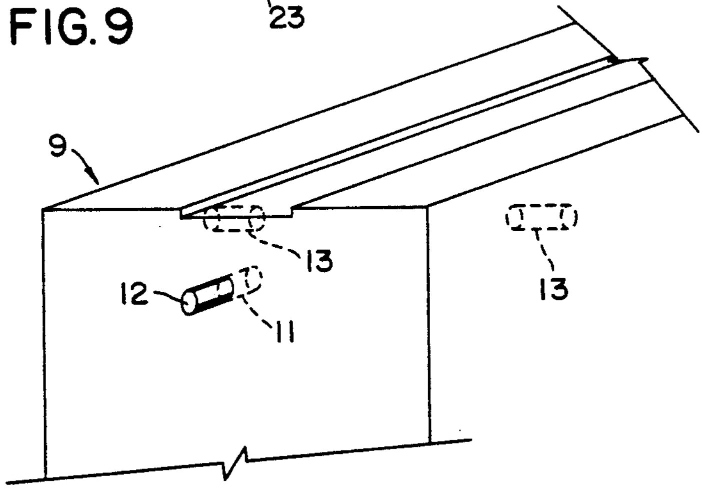
FIG. 10*a* is a partial perspective view of an alternate embodiment of the block.
Figure 11:
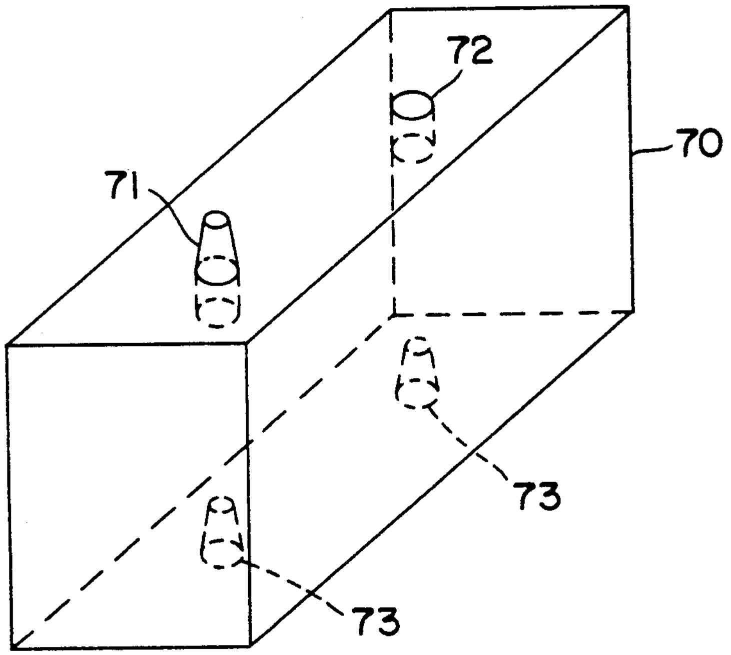
FIG. 11 is a perspective view of an alternative embodiment of the block invention.

Yet another embodiment of the invention is illustrated in FIG. 10*a*, 10*b*, and FIG. 1. Dowel holes approximately 1" in diameter and between 1 and 2 inches deep are cast into the ends of dowel hole blocks 9. The dowel holes are on a vertical center line of the end walls of the block and placed in an upper portion of the end wall on said center line. These two dowel holes may then be used with a modified tong lift for lifting the blocks into place. When blocks 9 are in place they have placed in them dowels 12 for additional stability of much the same type as provided by vertical keyways and keys above described, with the additional advantages that if corresponding side dowel holes 13 are cast into certain blocks in the molding process, then the special square corner key 2 × 4 may either be eliminated or at least supplemented by joining the end dowel hole 11 with the side dowel hole 13 at the corner by means of dowel 12. Pairs of side dowel holes may also be cast into blocks 9 along respective vertical center lines of the side faces of block 9 for alternate tong lift positioning.

Figure 6:
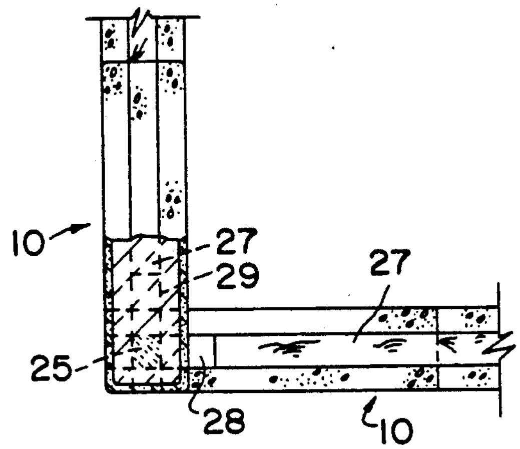
FIG. 6 is a plan view partial section showing a key placement at corner junctions.
Figure 7A:
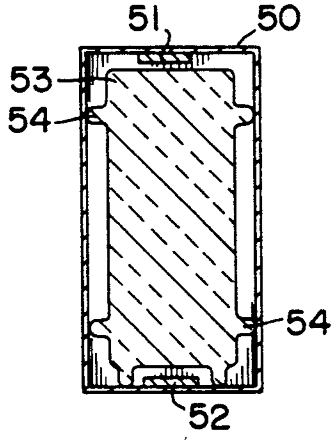
FIG. 7*a* is a vertical end section showing a molding embodiment for insulation block spacing.
Figure 7B:
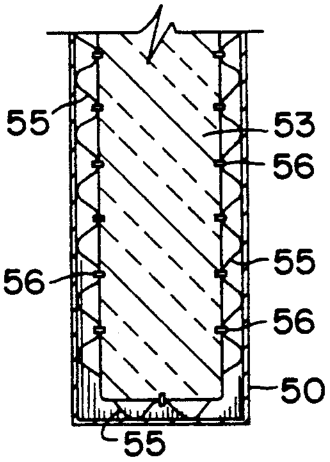
FIG. 7*b* a partial plan section of another embodiment for insulation block spacing.
Figure 7C:
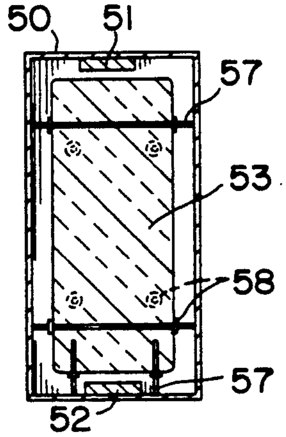
FIG. 7*c* is a vertical end section of an alternate embodiment for insulation block spacing.
Figure 7D:
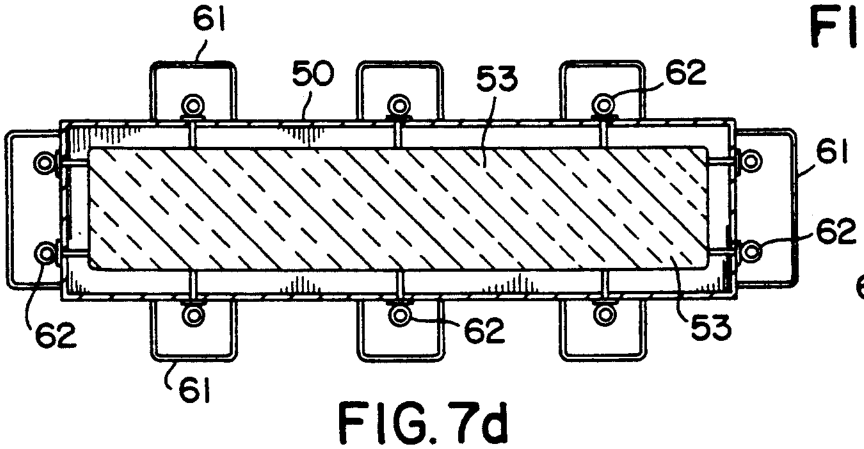
FIG. 7*d* is a partial plan section of another embodiment for insulation block spacing.
Figure 7E:
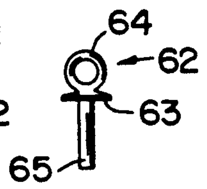
FIG. 7*e* is a detail of one of the ring pins employed in the embodiment shown in FIG. 7D.

In FIG. 6 is illustrated a preferred method for assembling the blocks at corners. Blocks are overlapped in conventional fashion and in the process of being overlapped bottom keyway 29 on an upper block will overlap and cross top keyway 28 on a lower block. The area of commonality of bottom keyway 29 and top keyway 28 forms a square area into which is placed a small square section of pressure treated 2 × 4 corner key 25 at corner key 25. In practice corner key 25 is placed in approximately correct location by measurement and upper block 10 is lowered down upon lower block 10 and corner key 25 then mates into bottom keyway 29.

In FIG. 7 various configurations of concrete molding forms are illustrated which are capable of fulfilling step 2 above in the method of making the concrete building blocks of the invention. In FIG. *7d*, a preferred embodiment is illustrated wherein steel form box 50, which is otherwise conventionally constructed, is drilled to receive a plurality of ring pins 62. Each ring pin 62 has a ring 64, a collar 63, and a shank 65. The shank and the holes in steel form 50 are sized to be a push fit one into the other. In practice a rectangular block of insulation 53 is placed within steel form 50 and each of the ring pins 62 are then pushed into the steel form until collar 63 makes contact with the outside of steel form 50, thus insuring that insulation block 53 is equally spaced from all four sides and from the bottom. Concrete is then poured into the form in conventional fashion under agitation necessary to insure uniform pouring beneath insulation block 53. After concrete has been poured, but before it sets up "green", ring pins 62 are all withdrawn back to make contact so that rings 64 make contact with the inside surface of handles 61. Handles 61 are shaped and dimensioned so that when ring 64 makes contact with its inside surface, the end surface of shank 65 is flush with the inside surface of steel form 50. The form is then reagitated to fill in the holes left by shanks 65, unless it is desirable to leave the holes in for some reason, as for instance the formation of dowel holes 11 and 13 discussed above. In that case the ring pins occupying positions where dowel holes are desired are left in until the concrete sets up green and are then withdrawn.

While the concrete is still "wet", ring pin withdrawal is accomplished with a minimum of effort since the wet concrete exerts little or no resistance to the withdrawal of the ring pins. At the same time no wet concrete can get into depressions or holes in the steel form 50 which would make removal of the finished concrete block 10 difficult or impossible. Where ring pins are to be withdrawn after the concrete sets up green some resistance can be anticipated but it is overcome by the application of a pinching or compressing force to pull ring 64 back against handle 61. As well known in the concrete pouring and molding industry, coating shank 65 with conventionally available releasing oil and keeping them free of concrete build-up and corrosion will reduce the effort required to withdraw ring pin 62 partially out of the mold after the concrete sets up green.

FIG. *7a* illustrates an alternate embodiment wherein the insulation blocks themselves have been manufactured or cast to have spacing buttons 54 along all four sides and their bottoms so that when insulation block 53 with spacing buttons 54 is placed within steel form 50 the outer extreme surfaces of buttons 54 make light contact with the inner surface of steel form 50 and so space insulation block 53 within the steel form. FIG. *7a* is a vertical end section and also illustrates positioning of key way plugs 51 and 52 which are conventionally employed to cast in keyways 28 and 29 respectively.

FIG. *7b* is a partial plan view of steel form 50 with a rectangular block of insulation 53 in place. In this embodiment the spacing is accomplished by corrugated metal strips 55 of such dimension that compression is required to lay the strips along side of the block between block 53 and inside surface of the steel form 50 around both sides and both ends of block 53. Once corrugated strips 55 have been laid around both sides and both ends, the insulation is manually lifted and manipulated so that it is appropriately spaced above the floor of steel form 50. The combined compressive force of corrugated strips 55 then holds insulation block 53 in place above the floor as well. Pins 56 are then inserted through prepunched holes in corrugated strips 53 to set the position of the corrugated strip relative to the insulation and to assist the corrugated strip in resisting displacement during the concrete pouring operation. As a further advantage once the concrete has set up, the corrugated strips act to some extent as reinforcing.

In FIG. *7c* an alternative embodiment of spacing insulation within steel form 50 is shown. Rods 57 of some low R value material such as some semirigid or rigid plastic material are run through a rectangular block of insulation 53. As an alternative, the rods are cast into the insulation during the insulation block manufacturing process. If the rods are to be run into the insulation after the insulation block is formed, well known compressing/gripping washers 58 are then run over the protruding ends of rods 57 in order to keep the block from shifting on the rods. These compressing washers are of a type commonly available. The rods 57 are of such a length that when run through insulation block 53, and then block 53 with rods 57 has been placed inside form 50, the ends of all of the rods are a light touch fit against the inside surfaces of form 50. If the protruding lengths of rods from the insulation block are all set to be equal to one another then the insulation block is equally spaced within form 50.

In an alternate embodiment of the building block of the invention, exterior and interior treatments in the form of grain, texture, or the like are cast into the side surface of block 10 during molding. For instance an arbitrarily defined exterior surface of block 10 can be texture cast with appropriate and conventional molding techniques to resemble stucco. At the same time and in the same mold the interior surface can be cast to resemble an interior plaster surface. Other interior and exterior surface treatments will occur to persons of ordinary skill in the arts and may all be either cast into the block during molding by conventionally available molding techniques. Variations on the above discussed molding techniques will occur due to such factors as releasability. Such treatments may also be added to the blocks by a supplemental cast, molding, or adhesive process. In this alternative embodiment the blocks arrive at the job site with an exterior and interior finish already applied so that when wall arrangement as illustratively shown for example in FIG. 2 is completed, the exterior and interior treatments have already been applied with only the necessity of some minor grouting at the joints and interfaces of the blocks.

In the embodiment of the invention in which exterior and interior surfaces are to be applied, it will necessary to make provisions for blocks which are to be joined together at corners. That is, one quarter of the interior surface will either have to be removed for a block which abuts its side to the end of another block at the corner. Alternatively, one quarter of the interior surface is left unfinished in the molding or manufacturing process. At the same time the en d surface of that same block will have to have an exterior treatment applied during the molding or manufacturing process.

During the construction phase of a preferred embodiment of the invention, the blocks are stacked using conventionally available glue, tar, calk, or mortar or even a thick cushioning and sealing tape. This will lend both rigidity and resilience to the structure and at the same time improve weather and insect sealing between the joints and the block.

INDUSTRIAL APPLICABILITY

This invention finds use in both the construction and concrete industries. The invention comprises method and apparatus for a concrete building block construction system which employs discrete insulated building blocks of varying configurations. When the building block apparatus of the invention is stacked together to construct a structure many of the details and expenses of conventional residential and commercial construction are eliminated.

In compliance with the statute, the invention has been described in language more or less specific as to structural features It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A method of making an insulated building block comprising the steps of:

(a) piercing said block of insulation with a plurality of rods to spaced said block of insulation form top, bottom and sides of a form, each of said rods having a length substantially equal to one of the inside dimensions of said form;

(b) filling said form with concrete to fill the space between the inside surfaces of said form and said block of insulation;

(c) covering said block of insulation with a layer of concrete.

* * * * *

UNITED STATES PATENT AND TRADEMARK OFFICE
CERTIFICATE OF CORRECTION

PATENT NO. : 5,186,883

DATED : February 16, 1993

INVENTOR(S) : John N. Beall, III

It is certified that error appears in the above-identified patent and that said Letters Patent is hereby corrected as shown below:

In Claim 1, column 8, line 51 of the Patent, change "form" to --from--.

Signed and Sealed this

Seventh Day of December, 1993

Attest:

BRUCE LEHMAN

Attesting Officer

Commissioner of Patents and Trademarks